Sept. 8, 1942.  C. V. GARDINER  2,294,976
MASTER CYLINDER
Filed Sept. 16, 1940
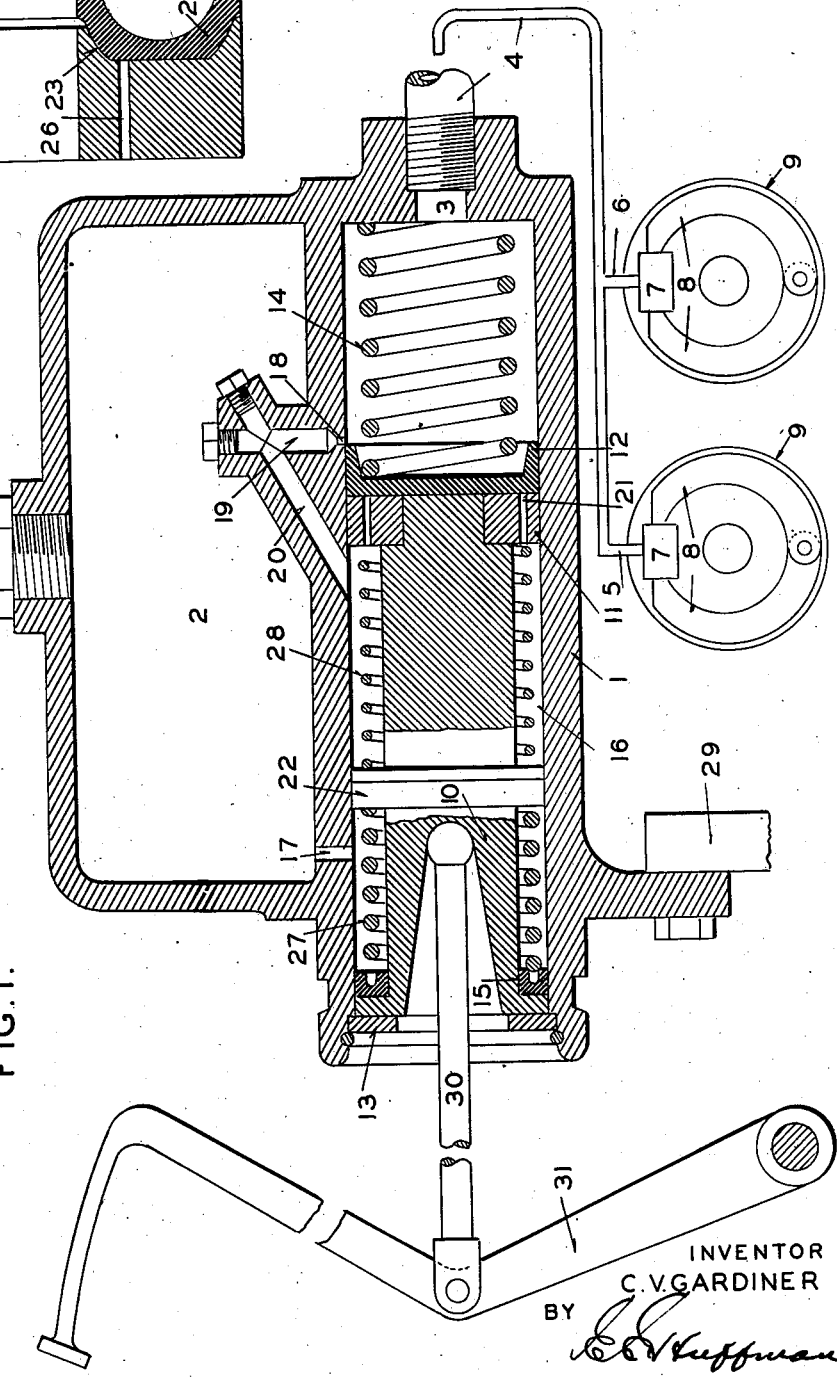
INVENTOR
C. V. GARDINER
BY
ATTORNEY Patented Sept. 8, 1942

2,294,976

UNITED STATES PATENT OFFICE 2,294,976

MASTER CYLINDER

Clarence V. Gardiner, Birmingham, Mich., assignor to Wagner Electric Corporation, St. Louis, Mo., a corporation of Delaware Application September 16, 1940, Serial No. 356,888

2 Claims. (Cl. 60—54.6)

My invention relates to master cylinders for producing fluid pressure and the principal object thereof is to embody in a master cylinder improved means for compensating for changes in volume of the fluid in the fluid pressure system of which the master cylinder is a unit and for also insuring that air will not enter said system during reciprocation of the piston.

Other objects of my invention will become apparent from the following description taken in connection with the accompanying drawing in which Figure 1 is a longitudinal sectional view of a master cylinder device having embodied therein my invention; and Figure 2 is an enlarged cross-sectional view of part of the floating annular piston on the main compressing piston.

Referring to the figures in detail, numeral 1 indicates the cylinder of the master cylinder device and 2 the reservoir, both being cast as an integral unit. The master cylinder may be employed to produce fluid pressure for any fluid pressure actuating system. However, as shown, the outlet 3 of the cylinder is connected by a conduit 4 and branch conduits 5 and 6 to the fluid motors 7 for actuating brake shoes 8 of brake assemblies 9 (two only being shown). Within the cylinder 1 is a reciprocable piston body 10 of smaller diameter than the cylinder and provided with a head 11 of the same size as the cylinder. The head has associated therewith a yieldable packing cup 12 of rubber or like material for preventing leakage of fluid past the piston when the fluid in the cylinder ahead of the piston is placed under pressure by forward movement of the piston. The piston is normally biased to its retracted position against a stop 13 by a spring 14 interposed between the head of the piston and the forward end of the cylinder. A packing cup 15 at the rear of the piston body prevents leakage at this point.

The chamber 16 between the piston body and the cylinder is in constant communication with the reservoir by a passage 17. When the piston is in its retracted position the cup 12 uncovers a port 18 which places the cylinder ahead of the piston in communication with the forward end of chamber 16 by means of passages 19 and 20 drilled in the partition wall between the cylinder and reservoir. The piston head 11 is provided with passages 21 which permit fluid to flow from chamber 16 to the cylinder ahead of the piston by slipping past the cup periphery in the event the port 18 is closed and the fluid in the cylinder ahead of the piston is below atmospheric pressure.

The intermediate portion of the piston body 10 has slidably mounted thereon an annular piston 22 (shown in section in Figure 2) dividing the chamber 16 into two compartments. The forward face of this piston is provided with an annular groove 23 and cooperating therewith is a yieldable annular sealing member 24 of U-shaped radial cross-section to thereby provide an outer lip 25 engageable with the cylinder wall and an inner lip 25' engageable with the piston body surface. In order that fluid may flow past the piston 22 from the compartment at the rear of the piston 22 to the compartment ahead of the piston, said piston is provided with passages 26. Between the piston 22 and the rear end of the piston body 10 is interposed a coil spring 27 which in its normal condition and with the piston body 10 in a retracted position will maintain the piston 22 in a position ahead of the passage 17 for placing the reservoir in communication with chamber 16. A very light coil spring 28 is interposed between piston 22 and piston head 11 to hold said piston in position against the end of spring 27.

The master cylinder is secured to any suitable support 29 and the main piston body 10 is actuated, as for example, by a piston rod 30 and brake pedal 31.

In operation the reservoir, master cylinder and the entire fluid system is first filled with fluid. This is best accomplished by providing an outlet at the fluid motors and associating therewith a one-way valve. When the piston is moved forwardly the air will be forced out of the system through this one-way valve. When the piston is permitted to return toward its retracted position, a sub-atmospheric pressure will be created in the system ahead of the piston 10 which will cause fluid to flow from the portion of chamber 16 at the rear of piston 22 to the portion of said chamber ahead of said piston (by way of passages 22 and past lips 24 and 25 of cup 23) and then through piston head passages 21 and past the periphery of packing cup 12. After the piston has been reciprocated several times, all the air will be forced out of the system and said system will be filled with fluid. When this is accomplished, the outlet at the fluid motor is sealed fluid-tight.

With the master cylinder and fluid system filled with fluid and the piston 10 in a retracted position, the parts of the master cylinder device will be in the positions shown. The port 18 will be uncovered and the annular piston 22 positioned forwardly of passage 17. If the fluid in the cylinder ahead of piston 22 and in the conduits and fluid motors should expand, due to an increase in temperature, the piston 22 will be forced rearwardly against spring 27 since the portion of the chamber ahead of the piston 22 is in communication with the cylinder ahead of piston 10 by means of passages 20 and 19 and port 18. If there is a contraction of fluid, fluid from the reservoir can flow past piston 22 and compensate therefor or if spring 27 is in a compressed condition as it will be most of the time (subsequently explained) piston 22 will be moved forward.

When piston 10 is moved forward, port 18 will be first closed and then fluid under pressure developed to operate the fluid motors 7 and apply the brakes. The piston 22 will move with piston 10 since the fluid pressure being developed cannot act thereon. When the piston is permitted to return by removal of the foot from the pedal, piston 10 can be retracted more rapidly under the action of spring 14 than the fluid is returned to the master cylinder by the action of the brake shoe return springs. If this occurs, there will be a tendency for sub-atmospheric pressure to be present ahead of piston 10 but this cannot occur since fluid from the reservoir can flow past both piston 22 and piston head 11 due to the passages 21 and 26 and the packing cup constructions. Excess fluid entering the chamber ahead of piston 10 will result in overcharging of the fluid system. When the piston uncovers the porthole 18, this excess fluid will be forced into the portion of chamber 16 ahead of piston 22 and will force this piston rearwardly and compress spring 27. If piston 22 should be forced backward past passage 17, some fluid can return to the reservoir. Spring 27 will be compressed under normal operating conditions since there will generally be some overcharging of the system taking place. This condition of the spring will cause the fluid in the system to be under a slight pressure when the piston 10 is in retracted position and port 18 is uncovered which is desirable.

When my improved master cylinder device is employed to develop fluid pressure for a fluid pressure actuated system, there will be no danger of air being drawn into the system and thus cause the fluid being compressed to be "springy." When the system is not in use, compensation for contraction of the fluid will be present to prevent entry of air. Also, retractile movement of the pressure developing piston cannot cause a sub-atmospheric pressure to occur in the system whereby air can be drawn in. Expansion of the fluid is also compensated for and because of this, there is no danger of the fluid motors being actuated by this expansion when such actuation is not desired. The improved master cylinder device also normally maintains the fluid in the system under a slight positive pressure when the piston is in an inoperative position.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a master cylinder construction, a cylinder, a piston reciprocable therein, means including a portion of the cylinder and a reduced portion of the piston forming an annular fluid containing chamber at the rear of the piston, means comprising a packing cup associated with the piston face for preventing at all times fluid from passing the piston from the cylinder ahead thereof but not in the opposite direction, conduit means independent of the piston for connecting the portion of the cylinder ahead of the piston for two-way communication with the chamber at the rear thereof only when the piston is in retracted position, a reservoir communicating with the chamber at the rear of the piston, an annular piston slidable on the reduced portion of the first named piston and dividing the annular chamber into two compartments, a spring for biasing the annular piston to a position intermediate the portion of the chamber communicating with the reservoir and the portion communicating with the conduit means leading to the cylinder ahead of the first piston, means including a packing cup preventing fluid from flowing past the annular piston from the forward compartment to the rear compartment but not in the opposite direction, and a second weaker spring interposed between the two pistons.

2. In a master cylinder construction, a cylinder, a piston reciprocable therein and having a cylindrical portion extending rearwardly from its head, means for establishing an annular fluid containing chamber around the cylindrical portion of the piston and at the rear of the piston head, conduit means independent of the piston for placing the cylinder ahead of the piston in two-way communication with the chamber at the rear of the piston head only when said piston is in retracted position means for permitting fluid to flow past the piston head from the chamber at the rear thereof during retractile movement of the piston but preventing flow in the opposite direction at all times, an annular piston slidable on the cylindrical portion of the piston, a spring for causing said annular piston to apply pressure to the fluid thereahead, means permitting fluid to flow past the annular piston from the rear thereof but not in the opposite direction, and a reservoir connected to maintain a body of fluid at the rear of the annular piston.

CLARENCE V. GARDINER.